United States Patent [19]
Jeunet et al.

[11] Patent Number: 6,082,754
[45] Date of Patent: Jul. 4, 2000

[54] STEERING BLOCKING MECHANISM FOR CHILD'S TOY

[75] Inventors: Christian Jeunet, Saint-Laurent-en-Grandvaux; Philippe Prost Petit Jean, Bonlieu; Gilbert Pauly, Blye, all of France

[73] Assignee: Etablissements Maurice Charton, Saint-Laurent-En-Grandvaux, France

[21] Appl. No.: 08/958,195

[22] Filed: Oct. 27, 1997

[30] Foreign Application Priority Data

Oct. 31, 1996 [FR] France ................................ 96 13552

[51] Int. Cl.[7] .............................. B62D 1/14; B62K 21/00
[52] U.S. Cl. ................................................ 280/272; 280/89
[58] Field of Search .................................. 280/272, 271, 280/282, 89

[56] References Cited

U.S. PATENT DOCUMENTS

| | | | |
|---|---|---|---|
| 579,664 | 3/1897 | McConley | 280/272 |
| 591,864 | 10/1897 | Meyer | 280/272 |
| 2,415,735 | 2/1947 | Fastborg. | |
| 4,138,131 | 2/1979 | Sommer. | |
| 4,674,761 | 6/1987 | Kassai. | |
| 4,714,261 | 12/1987 | Kassai. | |

FOREIGN PATENT DOCUMENTS

| | | | |
|---|---|---|---|
| 290478 | 4/1953 | Switzerland | 280/272 |
| 314538 | 7/1956 | Switzerland. | |
| 145370 | 7/1920 | United Kingdom. | |
| 815456 | 6/1959 | United Kingdom | 280/272 |

*Primary Examiner*—Peter C. English
*Attorney, Agent, or Firm*—Dowell & Dowell, P.C.

[57] ABSTRACT

A steering mechanism for a child's toy provided with a steering member linked to at least one steering wheel, a shaft traversed by a steering rod, a fork being linked to the steering wheel and positioned on one and the other side of the steering wheel, characterized by being provided with a mechanism for blocking rotation of the fork with respect to the shaft, in such a manner that the wheel is kept in a position essentially parallel to a main axis of the toy.

5 Claims, 5 Drawing Sheets

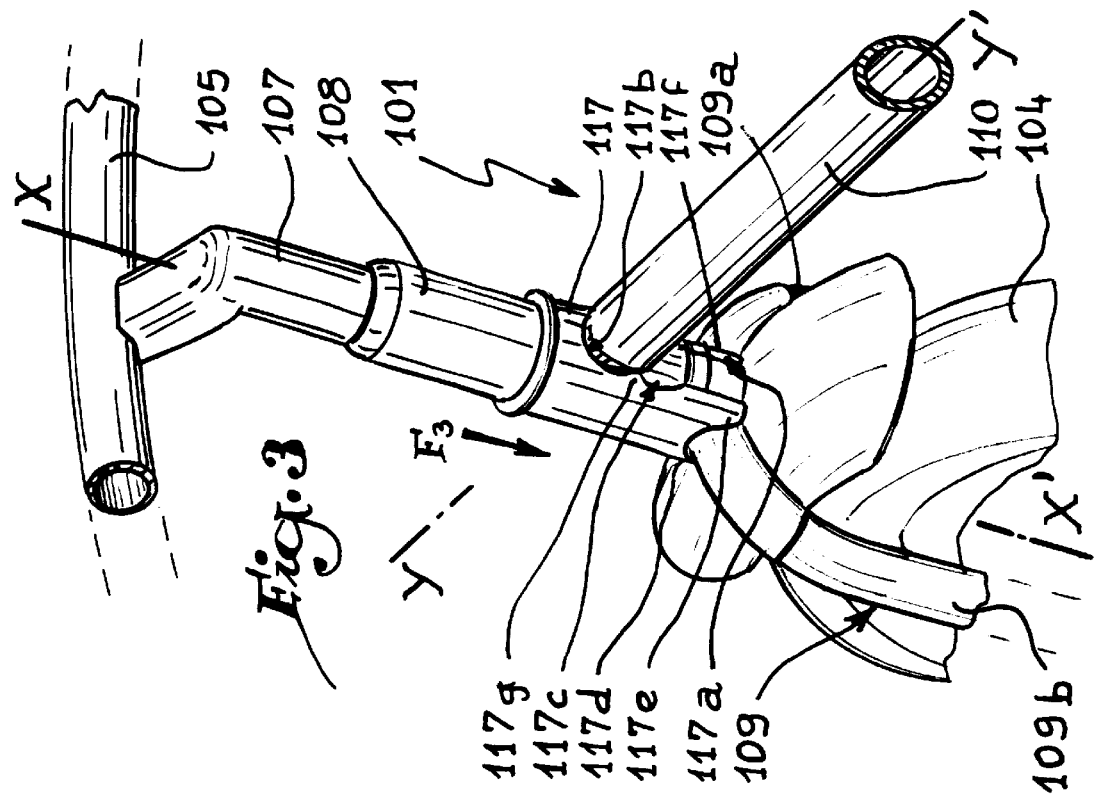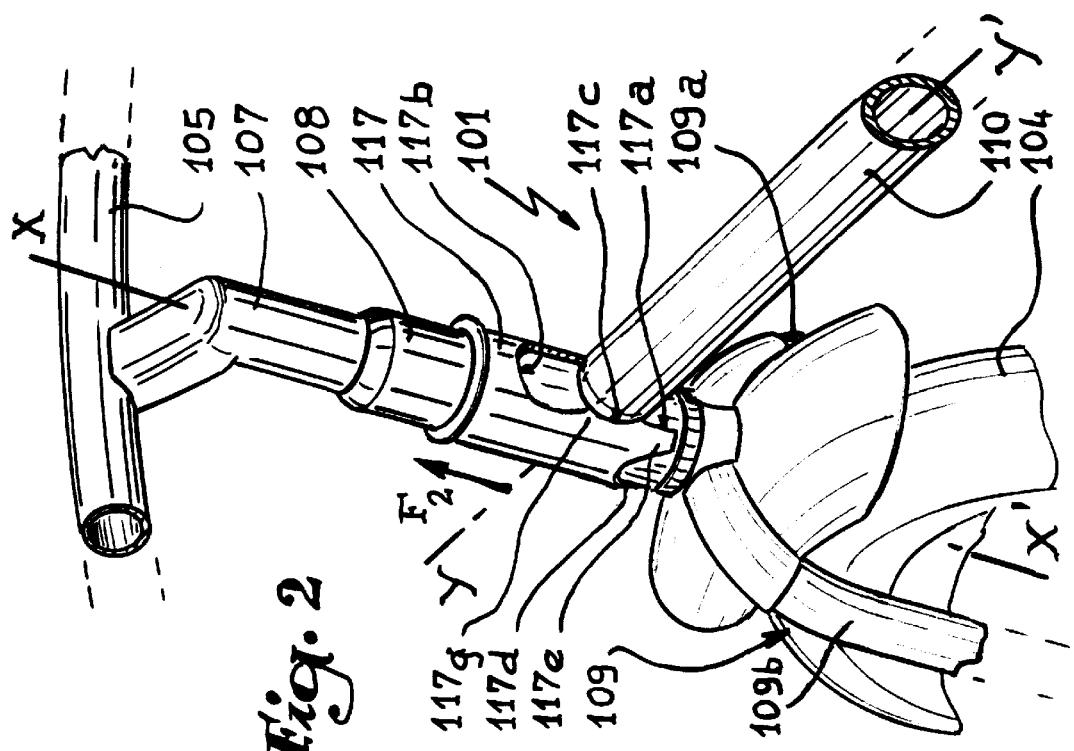

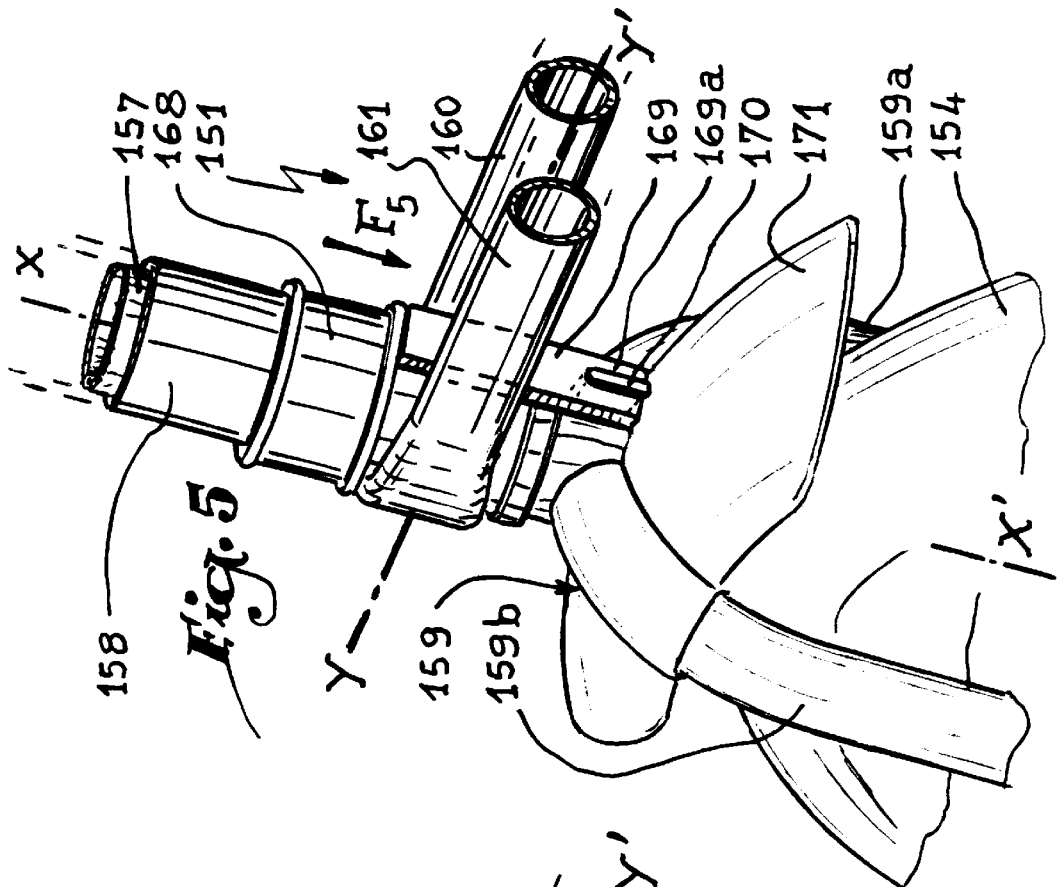
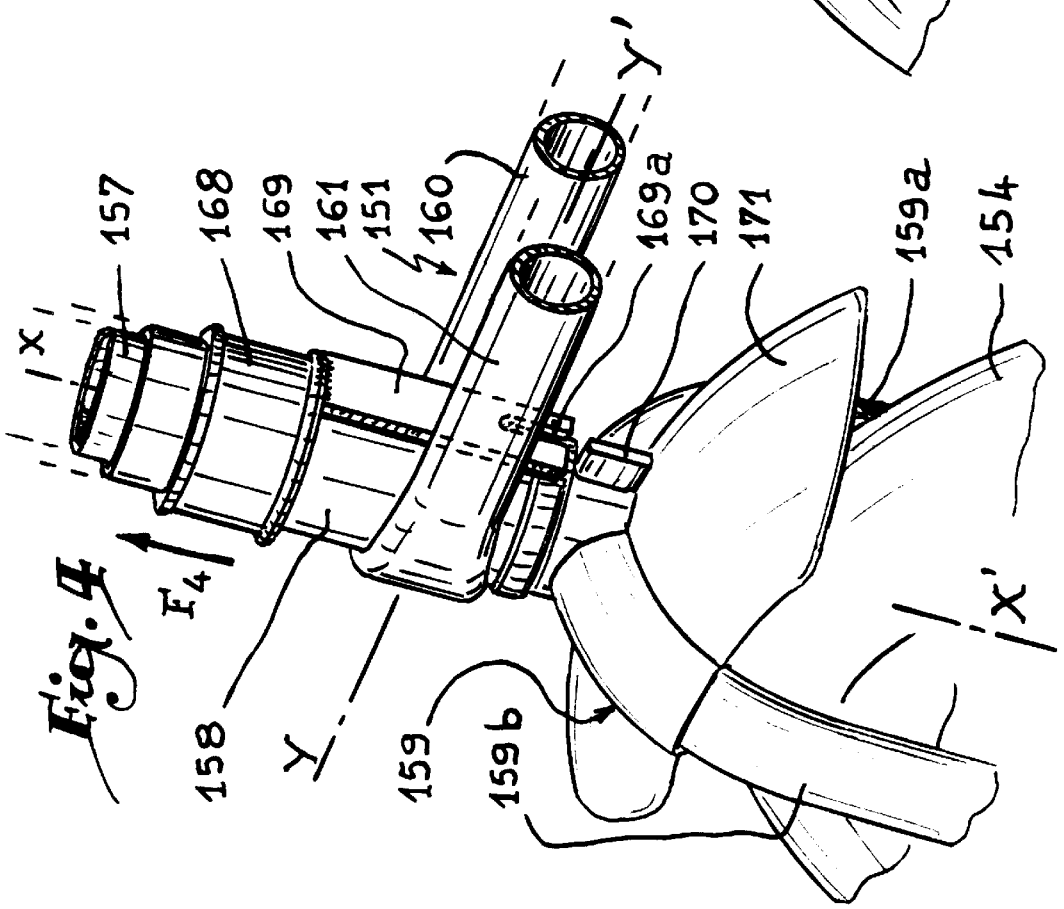

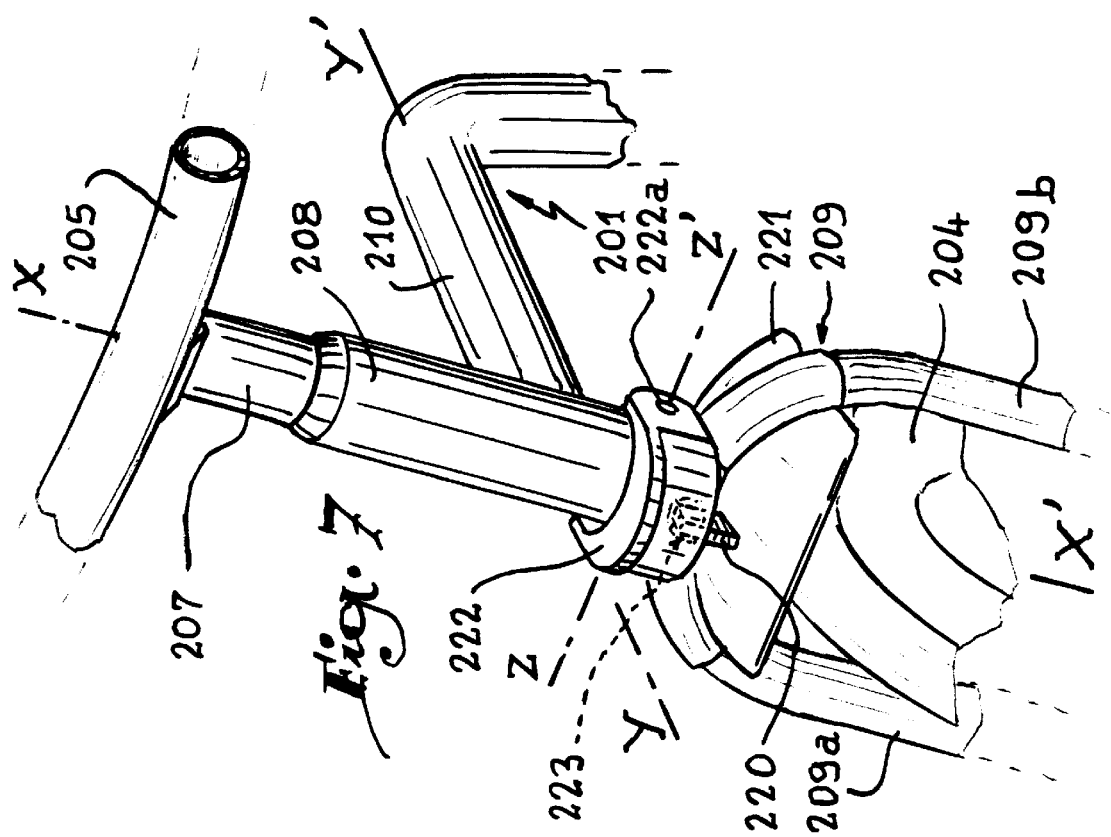
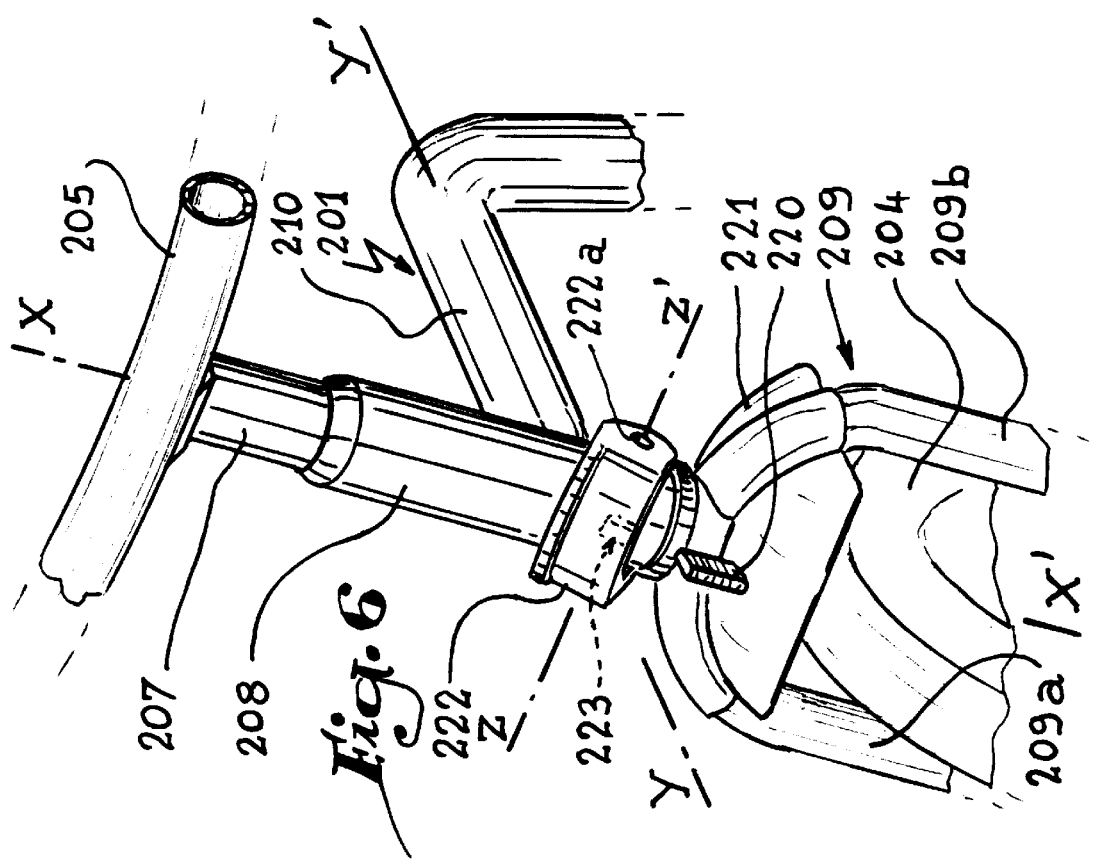

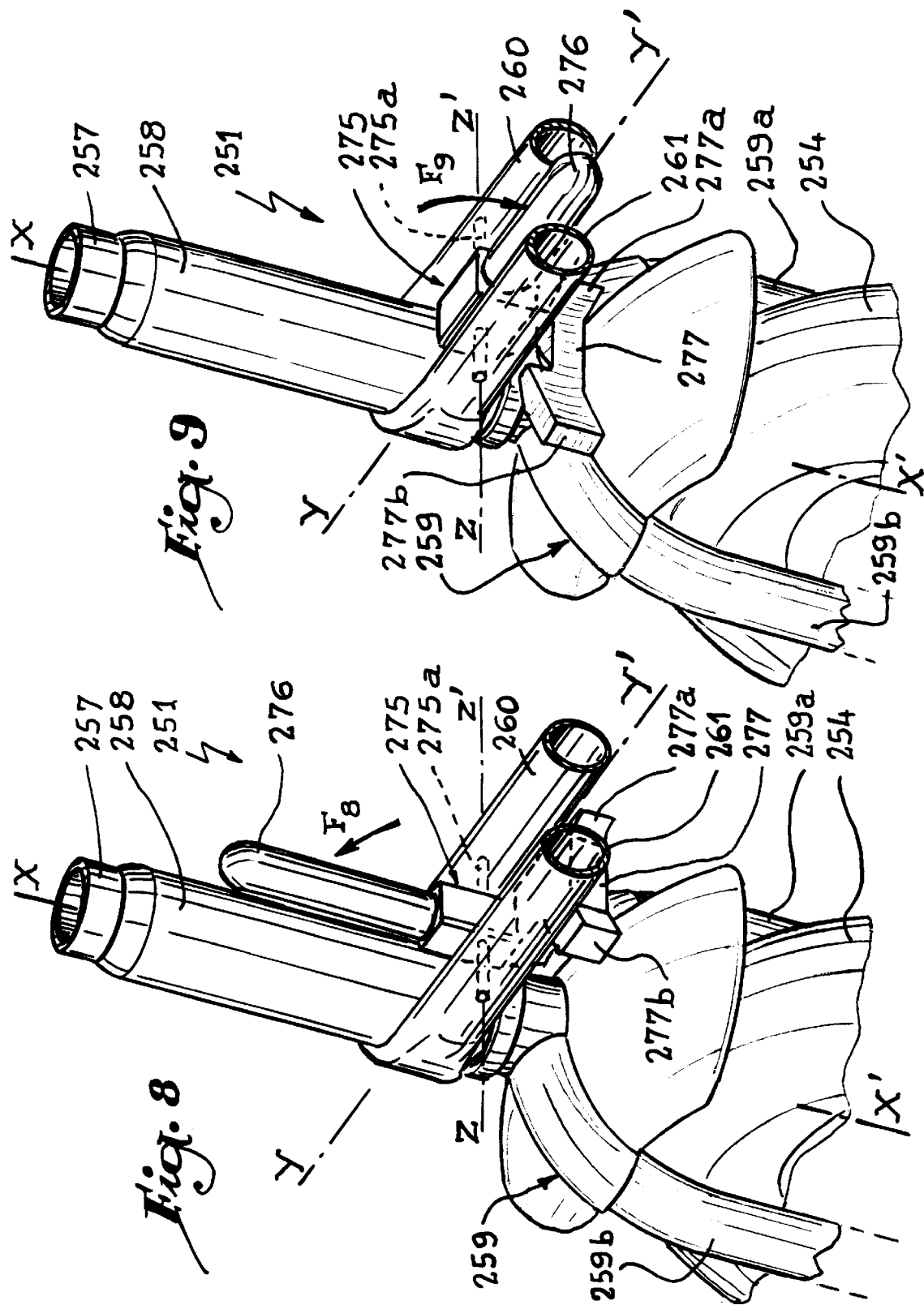

STEERING BLOCKING MECHANISM FOR CHILD'S TOY

BACKGROUND OF THE INVENTION

1. Field of the Invention

The present invention relates to a steering mechanism for a child's toy and to a toy, such as a tricycle, a tractor, a car with pedals or a carrier provided with such a steering mechanism.

2. History of the Related Art

It is known to provide children's toys with a steering mechanism that would allow the user to determine its path. Furthermore, it is known that sometimes it is necessary to push the toy and the child, especially when the child is tired or too small to pedal and to steer. For example, it is also know to provide a tricycle with a rod oriented towards the back which would allow the adult to push the tricycle without having to bend in a tiresome manner. In such a case, however, it happens that the child is not in condition to steer the tricycle according to the directions of the adult who is pushing it, and the child operates the steering mechanism in such a manner that the tricycle travels in an unwanted direction. This can bring about a bump or impact, that could injure the child and could prove to be painful for the adult. Thus, if the child operates the steering mechanism in order to turn to the right when the adult wishes to turn to the left, the latter applies a force on the rod that would cause the tricycle to turn to the left, so that the wrong turn by the child could make the toy topple; this, in turn, could result in the steering mechanism passing over the child which could be dangerous.

Furthermore, it is sometimes necessary to keep toys left by children on a playground. In such a case, when an adult pushes a toy from the back, be it a tricycle, a car, a carrier or a tractor, no force is applied upon the steering mechanism which becomes "uncontrolled," so that, in particular when the toy is pushed at a consistent speed, depending on the irregularities of the terrain over which it is pushed, the steering wheel(s) could move causing the vehicle to move in an unwanted direction.

Furthermore, in the case of a carrier or of a stroller, it is known that a toddler learns how to walk by holding on to the toy which, if it is provided with a steering mechanism, may turn by itself and take the child to an unwanted place.

SUMMARY OF THE INVENTION

The present invention has the aim of solving these problems and to submit a steering mechanism that would allow the child using the toy to ordinarily steer it by him/herself and the adult or a small child to effectively steer the toy when it becomes necessary to push it from behind.

With this is mind, the invention relates to a steering mechanism for a child's toy, that comprises a steering member connected to at least one steering wheel, a shaft traversed by a steering rod, a fork connected to said steering rod and attached on one and on the other side of the steering wheel, characterized by the fact that it is provided with a mechanism that blocks the rotation of the fork with respect to the mentioned shaft, in such a manner that the wheel is held in a position that is essentially parallel to the main axis of the toy.

Because of the invention, the use of the blocking mechanism allows a securing of the steering wheel in such a direction that it is essentially parallel to the other wheels of the toy, so that it can be easily steered by an adult who pushes it, by a child who steers with the handlebars or the steering wheel when the toy is not used, and even by a young child learning to walk. One can take advantage of the fact that it suffices to immobilize the fork with respect to the shaft in order to fix the direction of the steering wheel. In fact, the steering wheel is rigidly held by the fork.

In accordance with a first advantageous aspect of the present invention, the system comprises a tubular sleeve designed to slide around a shaft parallel to its main axis between a blocking position where claws of the tubular sleeve encircle branches of a fork and a release position in which the claws are separated from the branches of the fork. Because of this aspect of the present invention, the fork is immobilized from rotating with respect to the shaft thanks to the claws of the tubular sleeve that interact with the branches of the fork. In this case and in accordance with another advantageous aspect of the invention, the tubular sleeve is provided with a slot that forms two housings that can alternatively enclose an element attached to the shaft; the housing that encloses the element attached to the shaft determines the position of the sleeve with respect to the shaft. This aspect of the present invention allows the obtaining of a quick and effective positioning of the sleeve with respect to the shaft at a relatively low cost by making use of the elastic properties of the sleeve.

In accordance with another advantageous embodiment of the present invention, the steering mechanism comprises a tubular sleeve designed so as to slide around the shaft parallel to the main axis of the shaft, which sleeve is attached to a claw extending in direction to the steering wheel and is provided with a notch designed to cap or cover, according to the position of the sleeve with respect to the shaft, a pin attached to the fork or to a fender attached to it.

In accordance with another advantageous embodiment of the present invention, the mechanism comprises a stirrup hinged with respect to the shaft around an axis perpendicular to the main axis of the shaft; this stirrup is provided with a notch designed to cap or cover, according to the position of the lever with respect to the shaft, a pin attached to the fork or to a fender attached to it.

In accordance with another advantageous embodiment of this invention, the mechanism comprises a square lever hinged with respect to the shaft around an axis perpendicular to the main axis of the shaft; this square lever can move between a position where it is separated from the fork and does not hinder its movements and a position where one of its legs rests simultaneously against two branches of the fork while its other leg is housed between two tubes of the frame of the toy.

Finally, the present invention relates to a child's toy, especially a tricycle, a tractor, a car with pedals or a carrier provided with a steering mechanism as described above.

BRIEF DESCRIPTION OF THE DRAWINGS

The invention will be better understood and some of its other advantages will be more clearly elucidated in light of the below descriptions of six embodiments of a steering mechanism for a tricycle, given solely by way of example and referenced in the hereto attached drawings wherein:

FIG. 2 is a perspective view of a steering mechanism for a tricycle in accordance with a first embodiment of the present invention in a disengaged position;

FIG. 3 is a view analogous to that of FIG. 2 with the mechanism in a blocked position;

FIG. 4 is a perspective view of a steering mechanism for a tricycle in accordance with a second embodiment of the present invention in a disengaged position;

FIG. 5 is a view analogous to that of FIG. 4 with the mechanism in a blocked position;

FIG. 6 is a perspective view of a steering mechanism for a tricycle in accordance with a third embodiment of the present invention in a disengaged position;

FIG. 7 is a view analogous to that of FIG. 6 with the mechanism in a blocked position;

FIG. 8 is a perspective view of a steering mechanism for a tricycle in accordance with a fourth embodiment of the present invention in a disengaged position;

FIG. 9 is a view analogous to that of FIG. 8 with the mechanism in blocked position.

DESCRIPTION OF THE PREFERRED EMBODIMENT

Figure 1:
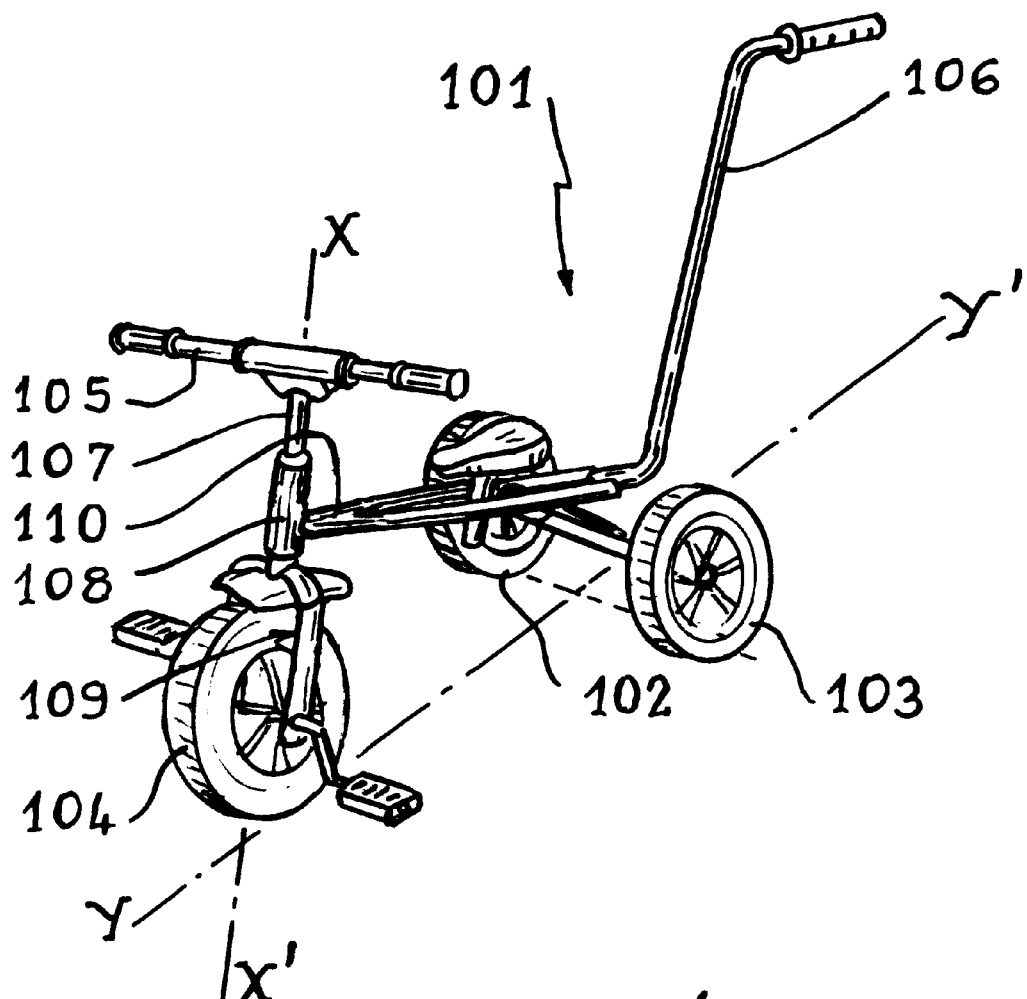
FIG. 1 shows a general perspective representation of a child's tricycle.

In FIG. 1, a tricycle 101 rests on its two rear wheels 102, 103 and a front steering wheel 104. The wheel 104 is designed to rotate around a globally vertical axis XX' that is controlled by means of handlebars 105. A rod 106 is attached in an eventually removable manner at the rear of the tricycle 101 for the pushing of the tricycle when the child is tired or when the tricycle must be moved when not in use.

As it can be seen more clearly from FIG. 2, the handlebar 105 is affixed to a steering rod 107 that traverses a shaft 108 and is connected to a fork 109 whose two legs 109a and 109b are attached on opposite sides of the steering wheel 104. The shaft 108 is part of the frame of the tricycle 101 and is linked to it by a crosspiece constituted by a tube 110.

In accordance with the present invention, a tubular sleeve 117 is positioned around the shaft 108 and is designed to slide around the shaft parallel to its main axis XX' in the direction of the arrows $F_2$ and $F_3$ illustrated in FIGS. 2 and 3, respectively. The sleeve 117 is provided with an arcuate seat 117a forming two round holes or openings, referenced 117b and 117c, respectively, designed to enclose a portion of the tube 110 in order to determine the position of the sleeve 117 with respect to the shaft 108.

In the disengaged position of FIG. 2, the tube 110 is encased or seated within opening 117c while, in the blocked position of FIG. 3, the tube 110 is encircled or seated within the opening 117b. One passes from the disengaged position of FIG. 2 to the blocked position of FIG. 3, and vice versa, by making use of the elastic properties of the sleeve 117 that can be advantageously made out of a plastic material such as, for example, polypropylene or polyamide.

The elastic nature of the sleeve 117 and the shape of the openings 117b and 117c tend to push the sleeve either towards the position of FIG. 2 or that of FIG. 3. In fact, when the sleeve 117 is between the these two positions, the tongues 117g that are defined between the openings 117b and 117c and of which only one is visible in the Figures, exert upon the tube 110 a force parallel to the rod 107, so that, by reaction, the sleeve 117 is pushed towards one of the shown positions.

The sleeve 117 is provided with four claws, of which three, 117d, 117e and 117f, are illustrated in FIGS. 2 and 3. In the blocked position of FIG. 3, the claws 117d and 117e encircle the leg 109b of the fork 109 while the claw 117f and the associated claw enclose the leg 109a. Thus, the fork 109 is immobilized to rotate around the axis XX' so that the entire steering mechanism, comprising the elements 105, 107, 109, and 104, is in a blocked position in which the steering wheel 104 is held essentially parallel to the main axis YY'0 of the tricycle 101. On the contrary, in the disengaged position of FIG. 2, the claws 117d, 117e and 117f are away from the legs of the fork 109, so that the fork is not hindered in its rotating movement around the axis XX'.

In the second embodiment illustrated in FIGS. 4 and 5, the components that are similar to those of the embodiment of FIGS. 2 and 3 are referenced by the same numbers increased by 50. In this embodiment, a not shown handlebar is affixed to a steering rod 157 traversing a shaft 158 and attached to a fork 159 provided with two legs 159a and 159a. Two tubes 160 and 161 forming part of a rigid frame of the tricycle 151 are affixed in relation to the shaft 158.

A sleeve or collar 168 is installed around the shaft 158 in a manner appropriate for sliding parallel to the main axis XX' of the shaft 158. This sleeve has a claw 169 provided with a notch 169a oriented towards the wheel 154. The sleeve 168 and the claw 169 are made out of one only piece by injection or they are affixed to each other by any appropriate means, especially, by gluing or by soldering. The sleeve 168 is moveable between two positions, disengaged (FIG. 4) and blocked (FIG. 5), and it can be immobilized in its disengaged position of FIG. 4 thanks to the tight mounting of the casing 168 on the shaft 158. The sleeve 168 moves along the shaft thanks to a force oriented in the direction of the arrow $F_4$, illustrated in FIG. 4.

A pin 170 is attached to the fork 159 in the immediate proximity of the shaft 158. When the wheel 154 is essentially parallel to the main axis YY'0 of the tricycle, the notch 169a can cap or engage the pin 170 by being brought into the blocked position of FIG. 5 thanks to a force $F_5$ oriented towards the wheel 154. In this position, the claw 169 prevents the rotational movements of the pin 170 around the axis XX', thus immobilizing the fork 159 in its rotation, so that the wheel 154 remains parallel to the axis YY'.

In accordance with a not shown variant of the present invention, the pin 170 can also be attached to a fender 171 mounted on the fork 169. The operation would be essentially the same as the one described above.

In the third embodiment of the present invention, illustrated in FIGS. 6 and 7, the components that are similar to those of the embodiment of FIGS. 2 and 3 are referenced by the same numbers increased by 100. In this embodiment, a handlebar 205 affixed to a steering rod 207 traverses a shaft 208 attached to a fork 209, whose legs 209a and 209b enclose a steering wheel 204. A tube 210 is attached to the shaft on which it rests. A stirrup 222 is hinged with respect to the shaft 208 around a spindle 222a positioned according to a ZZ' referenced axis, that is perpendicular to the main axis XX' of the shaft 208. This stirrup is provided with a notch 223 which, depending on its position with respect to the shaft 208, can cap or engage over a pin 220 affixed to the fork 209. When the notch 223 of the stirrup caps the pin 220 as illustrated in FIG. 7, the fork 209 is immobilized in its rotation around the axis XX', so that the wheel 204 is kept essentially parallel to the main axis YY'0 of the tricycle 201. As above, the pin 220 can be attached to a fender 221 mounted on the fork 209.

In the second and third embodiments illustrated in FIGS. 4 to 7, the pins 170 and 220 were shown either on the rear side of the fork 159 or on the front side of the fork 209. It must be understood that by modifying the direction of the claw 169 or of the stirrup 222 it would also be possible to see to it that pin 170 faces towards the front like pin 220 or that pin 220 faces towards the rear like pin 170.

In the fourth embodiment of the present invention, illustrated in FIGS. 8 and 9, the components that are similar to those of the embodiment of FIGS. 2 and 3 are referenced by the same numbers increased by 150. In this embodiment, a steering rod 257 attached to a not represented handlebar traverses a shaft 258 and is affixed to a fork 259 of which the two legs 259a and 259b encircle a steering wheel 254. A square lever 275 is hinged with respect to the tubes 260 and 261 of a rigid frame around a spindle 275a positioned according to an axis ZZ? perpendicular to the main axis XX' of the shaft 258. This lever 275 comprises a first branch 276 forming a handle which, in the disengaged position illustrated in FIG. 8, is essentially parallel to the shaft 258. The second branch 277 of the lever 275 is provided with two lateral extensions 277a and 277b in such a manner that they constitute a fork.

The lever 275 is moveable between the disengaged position illustrated in FIG. 8 in which it is separated from the fork 259 that is attained thanks to a force $F_8$ oriented towards the shaft 258, and the blocked position illustrated in FIG. 9 and attained thanks to a force $F_9$ in which its second branch 277 rests simultaneously on the two legs 259a and 259b of the fork 259 thanks to the lateral extensions 277a and 277b. Because of this, the fork 259 is immobilized in its rotation with respect to the axis XX' so that the wheel is kept parallel to the main axis YY' of the tricycle 251.

In the disengaged position illustrated in FIG. 8, the handle 276 abuts on the shaft 258 so that it does not constitute a potentially dangerous jutting-out component. In the blocked position illustrated in FIG. 9, the handle 276 is lodged between the two tubes 260 and 261, so that it does not present danger of injury to a child if this child would suddenly jump forward out of the tricycle's seat. The fact that the branch or handle 276 is lodged between the tubes 260 and 261 also allows to take the strain off the spindle 275a in the case of a strong force exerted on the wheel 254 which would tend to have the wheel 254 revolve around the axis XX'. In fact, the tubes 260 and 261 can absorb a rotational stress around the axis XX' transmitted by the handle 276 thanks to the play of the articulation of the lever 275 around the axis ZZ'.

The lever 275 can be immobilized in its position shown in FIG. 8 by any appropriate means. For example, the spindle 275acan be mounted tightly to the body of the lever and in the orifices corresponding to the tubes 260 and 261.

The present invention was represented with the steering mechanism installed in a tricycle but it is also applicable to other types of children's toys that comprise a steering mechanism, especially to a tractor, a car with pedals, a carrier or stroller with or without pedals, intended to be ridden by a child. Thus, the present invention pertains to toys that incorporate a steering mechanism such as described above.

What we claim is:

1. In a steering mechanism for a child's toy provided with a steering member linked to at least one steering wheel, a shaft traversed by a steering rod, a fork being linked to the steering wheel and positioned on opposite sides of the steering wheel, the improvement comprising: the steering mechanism is provided with a blocking mechanism moveable from a first position wherein said fork is rotatable with respect to said shaft to a second position for preventing the rotation of said fork with respect to said shaft in such a manner that said wheel is retained in a position essentially parallel to a main axis of the toy, said blocking mechanism including a tubular piece positioned around said shaft which slides parallel to a main axis of said shaft between said second position where said tubular piece is in contact with said fork and said first position where said tubular Piece is separated from said fork.

2. A steering mechanism in accordance with claim 1, wherein said tubular piece is a cylindrical sleeve having spaced claws which engage on opposite sides of spaced legs of said fork in said second position and are disengaged from said legs in said first position.

3. A steering mechanism in accordance with claim 2, in which said sleeve is provided with a slot forming two openings that are adapted to partially encircle an element attached to said shaft, a first of said openings partially encircling said element in said first position and a second of said openings partially encircling said element in said second position.

4. A steering mechanism in accordance with claim 1, wherein said tubular piece is a sleeve affixed to a claw extending in a direction toward said steering wheel and being provided with a notch appropriate to receive a pin fixed relative to said fork when said sleeve is in said second position.

5. A child's steerable riding toy provided with a steering mechanism in accordance with claim 1.

\* \* \* \* \*